June 22, 1926.
A. W. ERKINS ET AL
1,589,378
REAR VISION MIRROR BRACKET FOR AUTOMOBILES
Filed Oct. 23, 1924
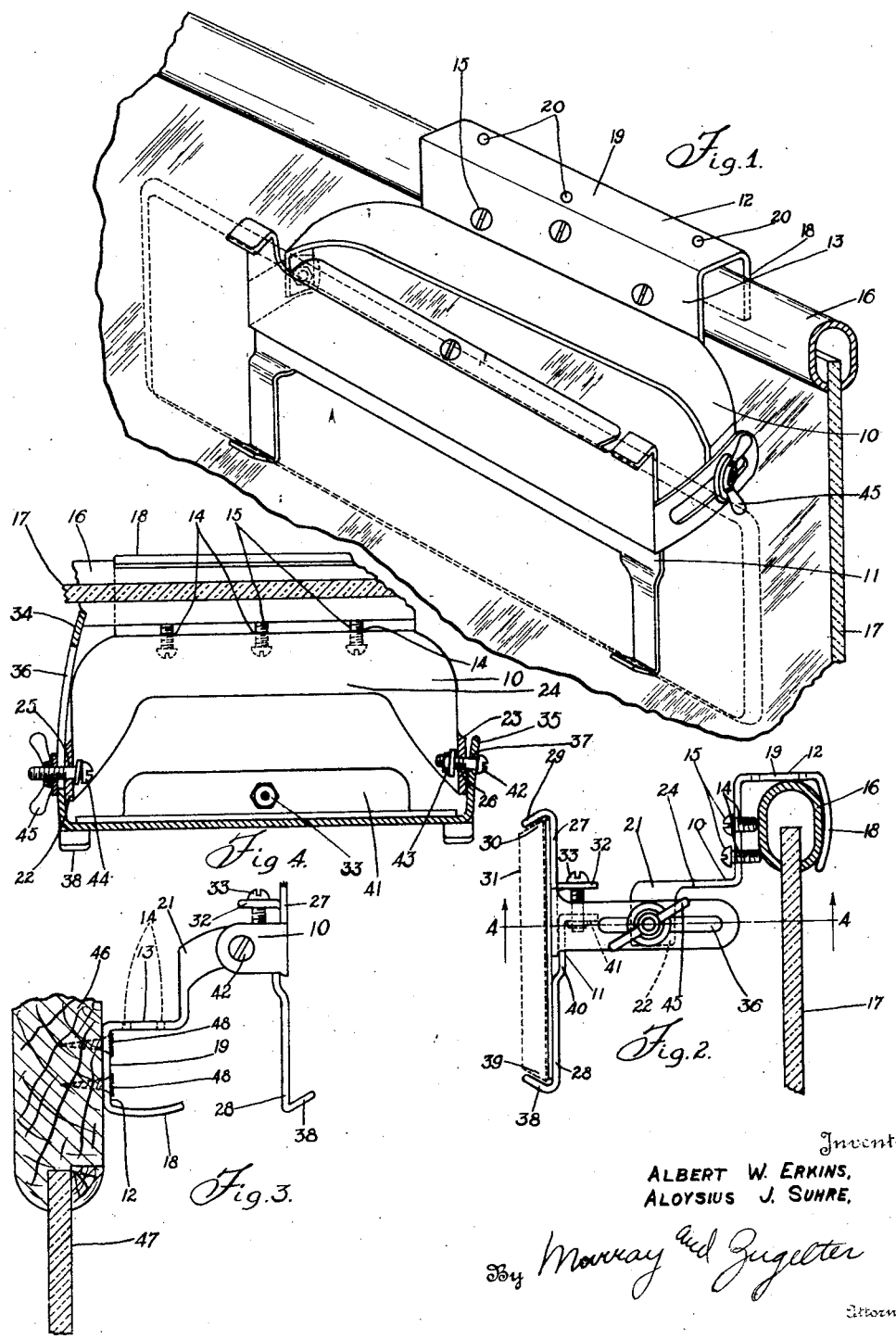
Inventor
ALBERT W. ERKINS,
ALOYSIUS J. SUHRE,
By Murray and Zugelter
Attorneys Patented June 22, 1926.

1,589,378

UNITED STATES PATENT OFFICE.

ALBERT W. ERKINS AND ALOYSIUS J. SUHRE, OF CINCINNATI, OHIO, ASSIGNORS TO THE MID WEST GLASS COMPANY, OF CINCINNATI, OHIO, A CORPORATION OF OHIO.

REAR-VISION-MIRROR BRACKET FOR AUTOMOBILES.

Application filed October 23, 1924. Serial No. 745,491.

An object of our invention is to provide a rear vision mirror bracket that is arranged for selective mounting on open or closed vehicles.

Another object of our invention is to provide a bracket that is capable of adjustment without the use of tools.

Another object of our invention is to provide a bracket with an adjustable mirror clamp to accommodate various widths of mirrors.

Another object is to provide a simple and efficient device to accomplish the above objects.

These and other objects are attained by the means described herein and disclosed in the accompanying drawings, in which:

Fig. 1 is a fragmental perspective view of a wind-shield of an open car having mounted thereon a rear vision mirror bracket of our invention.

Fig. 2 is a fragmental sectional view of a windshield of an open car having mounted thereon a rear vision mirror bracket of our invention.

Fig. 3 is a fragmental sectional view of a wind shield of a closed car having mounted thereon a rear vision mirror bracket of our invention. The view of the bracket is of the opposite side to that shown in Fig. 2.

Fig. 4 is a fragmental sectional view taken on line 4—4 of Fig. 2.

The device of our invention comprises a bracket 10, capable of being secured to open or closed cars, as desired, and an adjustable mirror clamp 11 adapted to seat mirrors of various widths.

One end 12 of the bracket 10 is of an inverted U-shape. One of the perpendicular sides 13 of the U-shaped end 12 has formed therein threaded perforations 14. Mounted in the threaded perforations 14 are bolts 15. The bolts 15 are used to secure the bracket 10 to the frame 16 of the wind-shield 17 of an open car. The other perpendicular side 18 of the U-shaped end 12 is placed on the outside of the frame 16 and the bolts 15 screwed against the inside of the frame 16 thereby securely fastening the bracket 10 on the frame. The horizontal base 19 of the U-shaped bracket 12 intermediate the perpendicular sides 13 and 18 has formed in it perforations 20, the object of which will be explained hereafter.

The other end 21 of the bracket 10 is developed into lugs 22 and 23 bent at right angles to the body portion 24 of the bracket 10. Lugs 22 and 23 have aligned perforations 25 and 26 in them.

The mirror clamp 11 is composed of a pair of telescoping clamps, an upper member 27 and a lower member 28 that can be drawn together to clamp a mirror between them. The upper edge of member 27 has arms 29 formed on it for receiving the upper edge 30 of a mirror 31. Intermediate the arms 29 and to the rear, member 27 is provided with a ledge 32. Ledge 32 is perforated to receive bolt and nut 33.

Member 27 has developed at its ends, ears 34 and 35. These ears form a way in which the lower member telescopes, and precludes lateral displacement of same. The ear 34 has formed in it an elongated perforation or slot 36 while ear 35 contains perforation 37. The perforations 25, 26, 36 and 37 formed in lugs 22 and 23 and ears 34 and 35 respectively are in alignment.

The lower member 28 of the mirror clamp 11 has formed on it arms 38 similar to arms 29 formed on member 27. The arms 38 are to receive the lower edge 39 of mirror 31. The upper portion of member 28 is off set so that it may slide over the member 27, as shown at 40 in Fig. 2. Member 28 has formed on it a ledge 41 corresponding to the ledge 32 formed on the upper member 27. Ledge 41 contains a perforation which is in alignment with the perforation in ledge 32 for the reception of bolt and nut 33.

When it is desired to clamp a mirror between the clamps the members 27 and 28 are pulled away from one another sufficiently to permit mirror 31 to slide between the arms 29 and 38. The bolt and nut 33 are then inserted through the perforations in ledges 32 and 41. The head of the bolt rests on the upper surface of ledge 32 while the nut is against the under surface of ledge 41. The bolt and nut are then screwed together thereby bringing ledges 32 and 41 toward one another and clamping the mirror between the arms 29 and 38.

The mirror clamp 11 and bracket 10 are hinged together by means of bolts 42, and 44, nut 43, and wing nut 45. Bolt 42 passes through perforations 26 and 37 in lug 23 and ear 35 respectively and receives nut 43. Bolt 44 passes through perforation 25 in lug 22 and the elongated perforation 36 in the ear 34 and receives the winged nut 45.

By using the bolts 42 and 44 as the pivots, the mirror 31 and clamp 11 can be adjusted in a vertical plane to any desired position. When the desired position is reached the wing nut 45 is tightened and prevents the jarring and motion of the machine from changing or moving the mirror from the adjusted position.

It will be observed from the drawings that the ears 34 and 35 are arcuate in shape. Wing nut 45 is loosened sufficiently to permit the ear 36 to slide between said wing nut and lug 25, between which the ear is normally clamped. The mirror 31 and clamp 11 can now be adjusted in a horizontal plane using bolt 42 as the pivot. Fig. 4 shows the mirror to be parallel with the wind shield while Fig. 1 shows the mirror at an angle to said wind shield.

Fig. 3 gives an illustration how our bracket and mirror clamp can be mounted on closed cars. The horizontal base 19 between the vertical sides 13 and 18 of the U-shaped end 12 is placed against the wooden frame 46 of the wind shield 47 and wood screws 48 passed through perforation 20 into the frame 46.

What we claim is:

1. In a mirror bracket of the class described the combination of a pair of telescopic clamps for receiving a mirror, the clamps overlapping and slidably contacting one another, one of the clamps comprising perforate arcuate ears of unequal length, the longer ear having an elongated slot and a bracket member comprising a pair of perforate lugs, each of the last mentioned lugs adapted to engage with one of the ears and all of the perforations in the lugs and ears being aligned, a bolt and nut extending through the shorter of the ears and its associated lug, and a bolt and wing nut extending through the elongated slot in the longer ear and its associated lug for clamping the said last mentioned lug and ear upon one another in various adjusted positions about the axis of the first mentioned bolt.

2. A bracket for mirrors of the type disclosed comprising a pair of telescopic members, the members overlapping and slidably contacting one another, the one member being provided with a pair of ears for precluding lateral displacement of the other member and each member being provided with a ledge extending in parallelism with the ledge provided on the other member, and means for drawing the ledges toward one another for clamping the telescopic members upon the mirror.

3. In a device of the class described the combination of a U-shaped bracket having a perforate base and threaded perforations in one of its sides, a body member extending at an angle to the perforated side, perforate lugs turned at the ends of the body at substantially right angles thereto, an adjustable mirror clamp having a pair of perforate ears in alignment with the perforate lugs formed on the bracket, and means insertable through the perforated ears and lugs for pivotally mounting the mirror clamp on the bracket, the mounting means being of such a nature as to permit the adjustment of the mirror clamp in a vertical and horizontal plane.

4. In a device of the class described the combination of an adjustable mirror clamp comprising a pair of gripping members, one of said members carrying a pair of arcuate ears of unequal length, the longer ear having formed therein an elongated perforation, the shorter ear having a perforation in it in alignment with the perforation in the first mentioned ear, a bracket suitable for selective mounting on the wind shield and on the body of a vehicle, and means for pivotally mounting the mirror clamp on the bracket, the mounting means being of such a nature as to permit the adjustment of the mirror clamp in a vertical and horizontal plane.

5. In a device of the class described the combination of a mirror clamp comprising an upper and lower member, the lower member being adapted to slide over the upper member, a perforate ledge on the upper member, a complementary perforate ledge on the lower member, means insertable through the perforations in the ledges for drawing the upper and lower members together, arms on the upper and lower members for retaining a mirror, arcuate perforate ears on the upper member, and a bracket having formed thereon perforate means complementary to the perforate ears formed on the upper member, and means insertable through the perforations in the last mentioned means and the perforate ears, the insertable means being adapted to secure the mirror clamp in an adjusted position on a horizontal and vertical plane.

6. In a device of the class described the combination of an adjustable mirror clamp having formed thereon a pair of arcuate ears, one ear being longer and carrying an elongated perforation and a bracket comprising a U-shaped member carrying a body portion, the body portion having developed at its ends a pair of depending lugs, each of the lugs being perforated, the perforations in the lugs and shorter ear and the elongated perforation in the longer ear are in alignment, means insertable through the perforations in the shorter ear and the perforation in one lug, and a second means insertable through the elongated perforation in the longer ear and the perforation in the second lug, the two last mentioned means acting as pivots about which the mirror clamp may be adjusted radially in a horizontal and vertical plane.

7. In a device of the class described the combination of a bracket comprising a U-shaped end having a perforated base and perpendicular sides, one of the sides being perforated, a body portion extending at an angle to and adjacent the perforated side, a pair of lugs developed at substantially right angles to the body portion and at the ends thereof, each of the lugs having a perforation formed in it, and a mirror clamp comprising upper and lower members, the lower member being adapted to slide over the upper member, a ledge formed on the upper member, a ledge formed on the lower member, aligned perforations in the ledges, arms formed on the upper and lower members for retaining a mirror, means insertable through the perforations in the ledges for drawing the upper and lower members together, a pair of arcuate perforate ears formed on the upper member, one ear being longer than the other and having formed in it an elongated perforation, the elongated perforation in the longer ear and the perforation in the shorter ear and lugs formed on the body portion are in horizontal alignment, and pivotal means insertable through the perforation in the shorter ear and one lug and a second pivotal means insertable through the elongated perforation in the longer ear and the second lug, the pivot means also serving the function of clamping the mirror in an adjusted position in a vertical and horizontal plane.

In testimony whereof, we have hereunto subscribed our names this 20th day of October, 1924.

ALBERT W. ERKINS.
ALOYSIUS J. SUHRE.